United States Patent
Boday et al.

(10) Patent No.: US 9,670,312 B2
(45) Date of Patent: Jun. 6, 2017

(54) FLAME-RETARDANT POLYMERS DERIVED FROM POLYOLS AND POLYACIDS

(71) Applicant: International Business Machines Corporation, Armonk, NY (US)

(72) Inventors: Dylan J. Boday, Tucson, AZ (US); Joseph Kuczynski, North Port, FL (US); Timothy C. Mauldin, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 14/632,392

(22) Filed: Feb. 26, 2015

(65) Prior Publication Data

US 2016/0251485 A1   Sep. 1, 2016

(51) Int. Cl.
*C08G 63/12* (2006.01)
*C09D 5/18* (2006.01)
*C08G 63/692* (2006.01)
*C08J 3/24* (2006.01)

(52) U.S. Cl.
CPC ......... *C08G 63/12* (2013.01); *C08G 63/6924* (2013.01); *C09D 5/18* (2013.01)

(58) Field of Classification Search
CPC .... C08G 18/46; C08G 18/4684; C08G 63/12; C08G 63/78; C08G 65/3353; C08G 63/6924; C08J 2367/00; C08J 3/24; C09D 5/18
See application file for complete search history.

(56) References Cited

U.S. PATENT DOCUMENTS

| | | |
|---|---|---|
| 4,010,137 A | 3/1977 | Brady |
| 4,940,632 A | 7/1990 | Nicola et al. |
| 8,344,096 B2 | 1/2013 | Takasawa et al. |
| 8,420,766 B2 | 4/2013 | Okabe et al. |
| 8,829,123 B2 | 9/2014 | Gan |
| 2014/0065392 A1 | 3/2014 | Alberts et al. |
| 2014/0163144 A1 | 6/2014 | Cernohous et al. |

FOREIGN PATENT DOCUMENTS

| | | | |
|---|---|---|---|
| CN | 101475683 | * | 1/2009 |
| EP | 2612884 A1 | | 7/2013 |
| JP | 2012177059 A | | 9/2012 |
| WO | 2012140237 A1 | | 10/2012 |

OTHER PUBLICATIONS

Dotan, Ana "Handbook of Thermoset Plastics: Biobased Thermosets", Third Edition, Pernick Faculty of Engineering, Shenkar College of Engineering and Design, Ramat-Gan, Israel, 2014, pp. 577-622.

* cited by examiner

*Primary Examiner* — Ling Choi
*Assistant Examiner* — Gennadiy Mesh
(74) *Attorney, Agent, or Firm* — Patterson + Sheridan, LLP

(57) ABSTRACT

A process for the production of a flame-retardant polymer is disclosed. The process includes reacting a triol with an organophosphate monochloride material to produce a phosphorus-functionalized hydroxyl material. The process further includes reacting the phosphorus-functionalized hydroxyl material with a polycarboxylic acid to form the flame-retardant polymer. Phosphorus is chemically bound to a polymer chain of the flame-retardant polymer.

15 Claims, 3 Drawing Sheets

FLAME-RETARDANT POLYMERS DERIVED FROM POLYOLS AND POLYACIDS

I. FIELD OF THE DISCLOSURE

The present disclosure relates generally to flame-retardant polymers.

II. BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

III. SUMMARY OF THE DISCLOSURE

According to an embodiment, a process for the production of a flame-retardant polymer is disclosed. The process includes reacting a polyol (e.g., a polyol derived from renewable sources) with a phosphorus-containing material to produce a phosphorus-functionalized polyol derivative. The process further includes reacting the phosphorus-functionalized polyol derivative with a polyacid to form the flame-retardant polymer. Phosphorus is chemically bound to a polymer chain of the flame-retardant polymer.

According to another embodiment, a flame-retardant polymer is disclosed. The flame-retardant polymer may be formed by a process that includes reacting a polyol with a phosphorus-containing material to produce a phosphorus-functionalized polyol derivative. The process may further include reacting the phosphorus-functionalized polyol derivative with a polyacid to form the flame-retardant polymer. Phosphorus is chemically bound to a polymer chain of the flame-retardant polymer.

According to another embodiment, a flame-retardant material is disclosed. The flame-retardant material is formed by a process that includes providing a phosphorus-functionalized polyol derivative for application to a surface of a substrate. The process further includes providing a polyacid for application to the surface of the substrate. The process also includes reacting the phosphorus-functionalized polyol derivative with the polyacid to form a flame-retardant polymer on the surface of the substrate. Phosphorus is chemically bound to a polymer chain of the flame-retardant polymer.

One advantage of the present disclosure is the ability to form a flame-retardant polymer from materials other than non-renewable petroleum feedstocks. Another advantage of the present disclosure is the ability to impart flame-retardant characteristics to a polymer by chemically binding phosphorus to a polymer chain (rather than using phosphorus as an additive after polymerization).

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
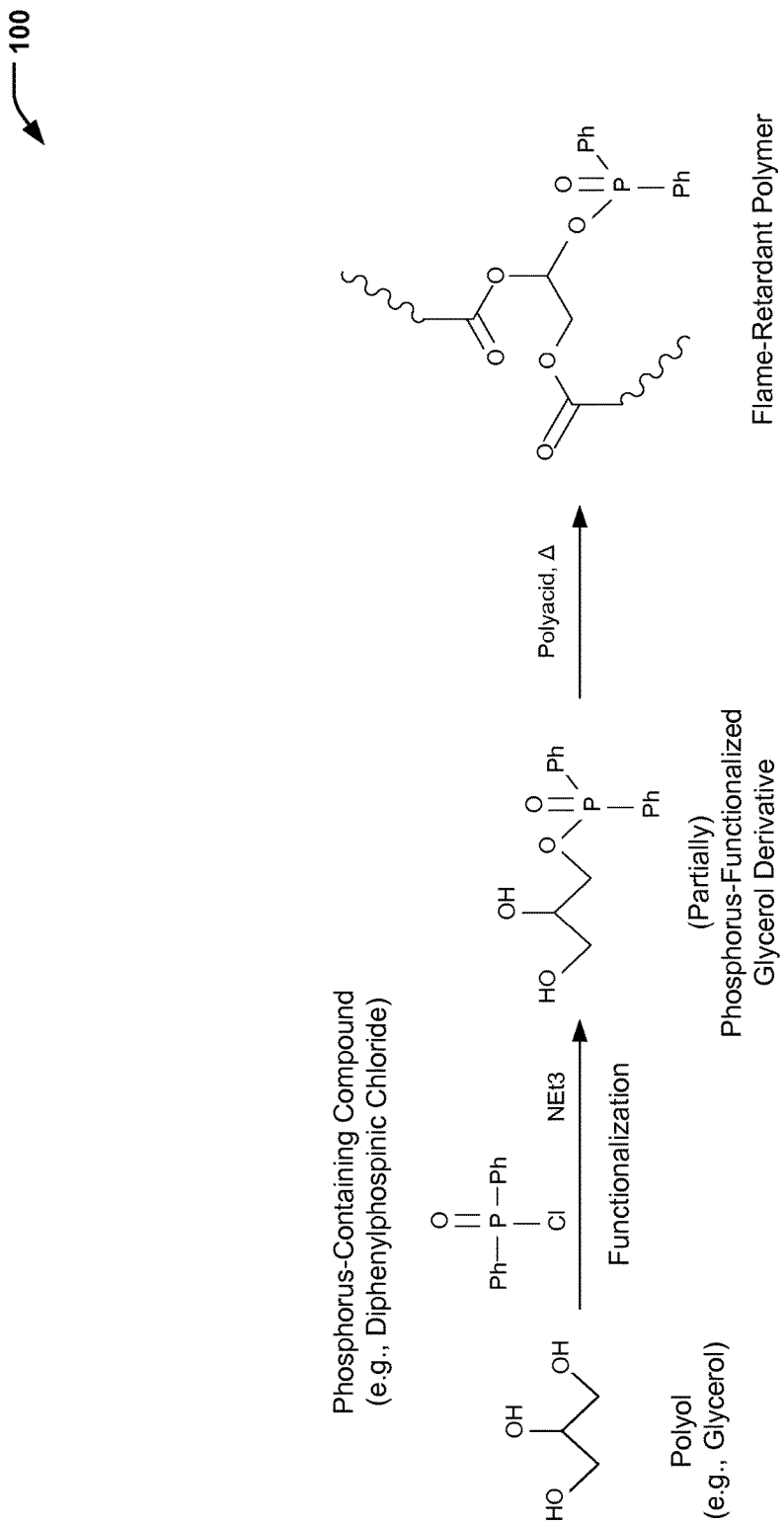
FIG. 1 is a chemical reaction diagram showing the preparation of a flame-retardant polymer from a polyol and a polyacid, according to one embodiment.

The present disclosure relates to production of flame-retardant polymers from polyols (e.g., alcohols having at least two hydroxyl groups) and polyacids (e.g., acids having at least two replaceable hydrogen atoms, also referred to as a "polybasic acid"). The flame-retardant polymers of the present disclosure include one or more phosphorus moieties that are chemically bound to a polymer chain. Chemically binding phosphorus to a polymer chain may result in a polymer with "inherent" flame-retardancy characteristics. Rather than "loading" a polymer with a phosphorus additive after polymerization, an amount of phosphorus that is chemically bound to a polymer chain may be controlled in order to impart particular flame-retardancy characteristic(s).

A process of producing a flame-retardant polymer may include reacting a polyol (or multiple polyols) with a phosphorus-containing material in order to form a phosphorus-functionalized polyol derivative. In some cases, the polyol may include a biologically derived alcohol having two or more hydroxyl groups (e.g., a diol, a triol, among other alternatives). To illustrate, glycerol is an example of a polyol that can be formed as a byproduct of production of diesel fuel from renewable materials (also referred to as "biodiesel"). In some regulatory environments (e.g., the European Union), replacement of non-renewable petroleum-based diesel with renewable biodiesel may be mandated. An increase in the production of biodiesel may result in an associated increase in the production of glycerol as a byproduct. The potential increase in the production of glycerol may result in a supply of glycerol that exceeds a market demand for glycerol. As such, while other polyol(s) may be used, biologically derived glycerol may represent a relatively inexpensive feedstock material compared to alternative polyols (in some cases).

As the polyol contains at least two hydroxyl groups, reaction stoichiometry may be controlled such that the polyol is (on average) partially phosphorus-functionalized. With partial phosphorus-functionalization, on average at least one hydroxyl group of each polyol molecule remains available for subsequent reaction with a polyacid. A molar ratio between a polyol and a phosphorus-containing material may be determined based on a number of hydroxyl groups in the polyol. As an example, a molar ratio of the phosphorus-containing material to the polyol may not be greater than about 1. To illustrate, in the case of a triol such as glycerol, limiting the molar ratio to not greater than about 1 may result in two hydroxyl groups (on average) of the three initial hydroxyl groups of the triol remaining non-functionalized (and available for subsequent reaction with a polyacid). As another example, less than 1 molar equivalent of phosphorus-containing material may be reacted with the polyol. To illustrate, in the case of a triol such as glycerol, reacting the triol with less than one molar equivalent of the phosphorus-containing material may result in a first subset of triol molecules being at least "mono-functionalized" (e.g., at least one phosphorus moiety is added). A second subset of triol molecules may remain non-functionalized (e.g., the three hydroxyl groups of the triol remain available for subsequent reaction with polyacid molecules).

In some cases, a degree of functionalization may be adjusted in order to provide a particular amount of phosphorus to impart particular flame retardancy characteristics to a polymer. The particular amount of phosphorus present in the polymer may be determined based on ratios and/or materials used as polyols, phosphorus-containing materials, polyacids, or any combination thereof. In some cases, a degree of phosphorus functionalization of the polyol may be adjusted such that a weight percentage of phosphorus (P) in a polymer (that is formed by reacting the partially-functionalized polyol derivative with the polyacid) is sufficient to impart particular flame-retardancy characteristics (e.g., as specified by a plastics flammability standard). As an illustrative, non-limiting example, a weight percentage of phosphorus (P) in the polymer of between about 15 weight percent and about 20 weight percent may be sufficient to satisfy one or more plastics flammability standards (in some cases).

After functionalization, the (partially) phosphorus-functionalized polyol derivative may be reacted with a polyacid to form a flame-retardant polymer with phosphorus chemically bound to a polymer chain. In some cases, the polyacid may be produced from renewable materials. As an illustrative example, a (poly)carboxylic acid, such as a tricarboxylic acid (e.g., citric acid), may be used. In a particular embodiment, a tri-acid may be selected for use in combination with a triol. The combination of a triol (e.g., glycerol) with a tri-acid (e.g., a tricarboxylic acid, such as citric acid) may result in a flame-retardant polymer with a high degree of cross-linking (and associated improvement in related chemical or mechanical properties).

In some cases, the flame-retardant polymers of the present disclosure may be formed on or applied to a surface of a substrate in order to impart flame-retardant characteristics to the substrate. To illustrate, the flame-retardant polymer may be formed on or applied to a surface of a component of an electronic device (e.g., prior to assembly of the electronic device). In some cases, the component may fail to satisfy a plastics flammability standard prior to formation or application of the flame-retardant polymer on the surface of the component. After formation or application of the flame-retardant polymer, the component may satisfy the plastics flammability standard.

An illustrative, non-limiting example, the plastics flammability standard may be specified by Underwriters Laboratories® (referred to as "UL" herein), such as UL 94, entitled "Standard for Safety of Flammability of Plastic Materials for Parts in Devices and Appliances testing." The UL 94 standard defines various criteria that may be used to classify a particular plastic based on a degree of flame-retardancy. To illustrate, in order for a plastic to be assigned a "V-0" classification, UL 94 specifies that burning stops within 30 seconds on a vertical specimen and that drips of particles are allowed as long as the particles are not inflamed. As an example, testing may be conducted on a 5-inch×0.5-inch (12.7 cm×1.27 cm) specimen of a minimum approved thickness (according to the UL 94 standard). It will be appreciated that the UL 94 V-0 plastics flammability standard is for example purposes only. Alternative or additional plastics flammability standard(s) may be applicable in various contexts.

FIG. 1 illustrates a chemical reaction diagram 100 showing the preparation of a flame-retardant polymer from a polyol and a polyacid, according to one embodiment. In FIG. 1, a polyol (e.g., a biologically derived polyol, such as glycerol) may be used as a starting material to prepare a phosphorus-functionalized polyol derivative, which may then be reacted with a polyacid to form a flame-retardant polymer. Rather than using phosphorus as an additive after polymerization, FIG. 1 illustrates an example of a polymer (e.g., a polyester) that inherently (e.g., irrespective of additives) exhibits particular flame-retardancy characteristic(s) provided by phosphorus that is chemically bound to a polymer chain. For illustrative purposes only, FIG. 1 illustrates an example of a phosphorus-functionalized polyol derivative that includes (on average) two unreacted hydroxyl groups of the polyol. As described further herein, reaction stoichiometry may be controlled such that (on average) the phosphorus-functionalized polyol derivative includes at least one unreacted hydroxyl group of the polyol (for subsequent reaction with a polyacid to form the flame-retardant polymer).

FIG. 1 illustrates that a polyol may be reacted with a phosphorus-containing material to form a phosphorus-functionalized polyol derivative. In the particular embodiment illustrated in FIG. 1, the polyol includes a triol (e.g., glycerol). Alternatively or additionally, one or more other polyols (including diols) may be used. Thus, while FIG. 1 illustrates an example of a polyol with three hydroxyl groups, it will be appreciated that different polyol(s) having an alternative number and/or arrangement of hydroxyl groups may be used. In some cases, the polyol may be a biologically derived polyol. As an example, glycerol may represent a byproduct of biodiesel production. Other examples of biologically derived polyols may include polyols derived from sugars, soybean oil, or castor oil, among other alternatives.

In the particular embodiment illustrated in FIG. 1, the phosphorus-containing material includes a chlorinated diphenyl phosphate material, such as diphenylphosphinic chloride (with the phenyl rings identified as "Ph" in FIG. 1 for illustrative purposes only). Alternatively or additionally, the phosphorus-containing material may include one or more other phosphorus-containing compounds. For example, the phosphorus-containing material may include other halogenated organophosphate compound(s). As another example, the phosphorus-containing material may include functionalized phenyl groups, alkyl groups, alkoxy groups, or amine groups, among other alternatives. FIG. 1 illustrates that functionalization of glycerol may take place in the presence of one or more other materials, such as triethylamine (identified as "NEt3" in FIG. 1). As an illustrative, non-limiting example, glycerol and trietyhlamine (having a molar ratio of about 1:1) may be dissolved in tetrahydrofuran (e.g., 10% v/v solution), and a stoichiometric amount of diphenlyphosphinic chloride may be slowly added dropwise at temperatures ranging from about 0° C. to about 30° C. Upon completion of addition, the solution may be stirred for about 1 hour. A solid precipitate may be filtered, and the solvent may be removed (e.g., under vacuum) to reveal phosphorus-functionalized glycerol.

In the example of FIG. 1, the polyol is illustrated as being partially phosphorus functionalized. The example phosphorus-functionalized polyol derivative of FIG. 1 includes two unreacted hydroxyl groups of the polyol. For illustrative purposes only, a single (primary) hydroxyl group of the polyol is shown as reacting with the phosphorus-containing material to form the (partially) phosphorus-functionalized polyol derivative. The phosphorus-containing material may be more likely (on average) to react with a primary hydroxyl group than with another hydroxyl group. However, it will be appreciated that different hydroxyl groups (e.g., a primary hydroxyl group, a secondary hydroxyl group, a tertiary hydroxyl group, or a combination thereof) of a particular polyol molecule may react with the phosphorus-containing material. Further, it will be appreciated that an alternative number of hydroxyl groups (e.g., more than one hydroxyl group) of a particular polyol molecule may react with the phosphorus-containing material.

Figure 2:
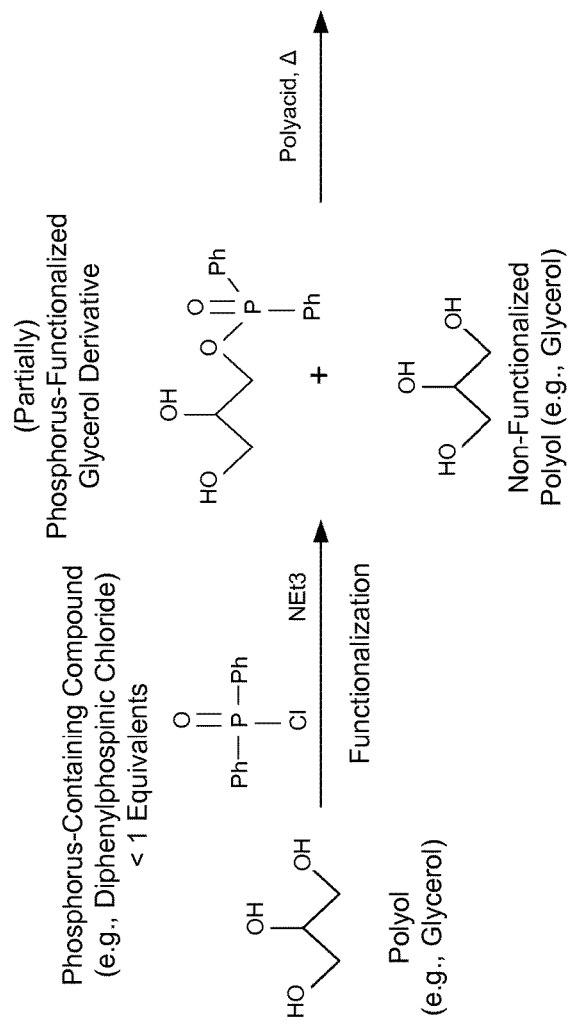
FIG. 2 is a chemical reaction diagram showing the preparation of a flame-retardant polymer from a polyol and a polyacid, according to one embodiment.
Figure 2:
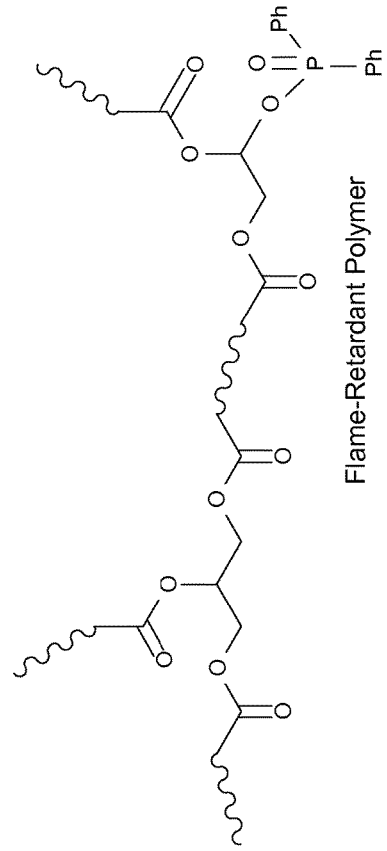

As described further herein with respect to FIG. 2, reaction stoichiometry may be controlled such that a first subset of polyol molecules may be at least mono-functionalized (e.g., at least one phosphorus moiety is added), and a second subset of polyol molecules may not be phosphorus functionalized. As shown in the example of FIG. 2, unreacted hydroxyl groups of non-functionalized polyol molecules may represent additional hydroxyl groups that may be available for subsequent cross-linking. Thus, it will be appreciated that the example reaction of a single hydroxyl group of a single polyol molecule with a single phosphorus-containing molecule in FIG. 1 is for illustrative purposes only.

FIG. 1 further illustrates that the (partially) phosphorus-functionalized polyol derivative may be reacted with a polyacid to form a flame-retardant polymer (e.g., a flame-retardant polyester). Unreacted hydroxyl group(s) of the phosphorus-functionalized polyol derivative may react with the polyacid. In some cases, the phosphorus-functionalized polyol derivative may include (on average) one unreacted hydroxyl group of the polyol that is available for reaction with the polyacid. In other cases, the phosphorus-functionalized polyol derivative may include (on average) more than one unreacted hydroxyl group of the polyol that is available for reaction with the polyacid. As an illustrative, non-limiting example, the phosphorus-functionalized polyol derivative and the polyacid may be mixed in appropriate stoichiometric amounts (depending on an extent of phosphorus functionalization). p-Toluenesulfonic acid (e.g., about 1 percent by weight) may be dissolved in the polyol/polyacid blend, and the resulting solution may be heated to about 120° C. for about 12 hours.

In some cases, the polyacid (or more than one polyacid) that is reacted with the polyol may be produced from renewable materials. As an illustrative example, a (poly) carboxylic acid, such as a tricarboxylic acid (e.g., citric acid), may be used. A combination of a triol (e.g., glycerol) with a tri-acid (e.g., a tricarboxylic acid, such as citric acid) may result in a flame-retardant polymer with a high degree of cross-linking (and associated improvement in chemical and/or mechanical material properties).

In the particular embodiment illustrated in FIG. 1, the polyol includes a triol (e.g., glycerol). FIG. 1 illustrates an example of phosphorus functionalization of a glycerol molecule in which a resulting phosphorus-functionalized glycerol derivative includes a first unreacted hydroxyl group of the glycerol molecule and a second unreacted hydroxyl group of the glycerol molecule. FIG. 1 illustrates that the first unreacted hydroxyl group of the phosphorus-functionalized glycerol derivative reacts with a polyacid, and the second unreacted hydroxyl group of the phosphorus-functionalized glycerol derivative reacts with the polyacid.

Thus, FIG. 1 illustrates an example of a process of producing a phosphorus-functionalized polyol derivative that may be reacted with a polyol, resulting in a polymer with phosphorus chemically bound to a polymer chain. Rather than "loading" a polymer with a phosphorus additive after polymerization, FIG. 1 illustrates an example of polymer that is "inherently" flame-retardant as a result of phosphorus being chemically bound to a polymer chain. In some cases, the flame-retardant polymer may be formed on a surface of a component of an electronic device (e.g., prior to assembly of the electronic device) in order to satisfy a plastics flammability standard (e.g., the UL 94 standard).

FIG. 2 is a chemical reaction diagram 200 showing the preparation of a flame-retardant polymer from a polyol and a polyacid, according to one embodiment. FIG. 2 illustrates that reaction stoichiometry (of a reaction of a polyol with a phosphorus-containing material) may be controlled such that a first subset of polyol molecules may be at least mono-functionalized (e.g., at least one phosphorus moiety is added), and a second subset of polyol molecules may not be phosphorus functionalized. Unreacted hydroxyl groups of non-functionalized polyol molecules may represent additional hydroxyl groups that may be available for subsequent cross-linking. As described further herein, a degree of functionalization may be adjusted in order to provide a particular amount of phosphorus to impart particular flame retardancy characteristics to a polymer.

For illustrative purposes only, FIG. 2 illustrates an example in which the polyol includes glycerol, and the phosphorus-containing material includes diphenylphosphinic chloride (with the phenyl rings identified as "Ph" in FIG. 2 for illustrative purposes only). As previously described with respect to FIG. 1, glycerol and/or one or more other polyols may be used. Further, as previously described with respect to FIG. 1, the phosphorus-containing material may include diphenylphosphinic chloride and/or one or more other phosphorus-containing compounds.

In the first reaction illustrated in FIG. 2, glycerol is reacted with the phosphorus-containing material to form a phosphorus-functionalized glycerol derivative. FIG. 2 illustrates that, by controlling the reaction stoichiometry in the first reaction of FIG. 2, a first subset of glycerol molecules may be (partially) phosphorus-functionalized (e.g., at least one phosphorus moiety is added), and a second subset of glycerol molecules may be non-functionalized (e.g., the three hydroxyl groups remain unreacted and available for subsequent reaction with a polyacid). As shown in the second reaction of FIG. 2, the unreacted hydroxyl groups of the non-functionalized glycerol molecules may allow for cross-linking during formation of the flame-retardant polymer.

In some cases, an amount of the phosphorus-containing material to be reacted with a particular polyol may be determined based on a desired "degree" of phosphorus functionalization of the particular polyol (e.g., a molar ratio of phosphorus-functionalized polyol molecules to non-functionalized polyol molecules). The degree of phosphorus functionalization may correspond to a degree of cross-linking in the flame-retardant polymer, with a lower degree of phosphorus functionalization allowing for a higher degree of cross-linking as a result of the availability of additional unreacted hydroxyl groups of the phosphorus-functionalized polyol derivative for cross-linking. While lower degrees of phosphorus functionalization may allow for additional cross-linking in the flame-retardant polymer, threshold degrees of phosphorus functionalization may be associated with different flame-retardancy characteristics. Accordingly, a first threshold molar ratio (a "lower bound") of phosphorus-containing material to polyol may be associated with a particular "loading" of phosphorus (via chemical bonding to a polymer chain) that allows the polymer to satisfy a particular plastics flammability standard (e.g., the UL 94 V-0 plastics flammability standard). In a particular embodiment, the first molar ratio of phosphorus-containing material to polyol may not be less than about 0.5. A second threshold molar ratio (an "upper bound") may be associated with a different "loading" of phosphorus that allows for sufficient cross-linking in the polymer to provide desired chemical and/or mechanical material properties. In a particular embodiment, the second molar ratio of phosphorus-containing material to polyol may not be greater than about 1.

As an example, reacting glycerol (a triol) with about 0.5 molar equivalents of the phosphorus-containing material may result in about fifty molar percent of the glycerol molecules being functionalized (with two unreacted hydroxyl groups available for subsequent reaction), while about fifty molar percent of the glycerol molecules may be non-functionalized (with three unreacted hydroxyl groups available for subsequent reaction). As another example, reacting glycerol with about 0.9 molar equivalents of the phosphorus-containing material may result in about ninety molar percent of the glycerol molecules being functionalized (with two unreacted hydroxyl groups available for subsequent reaction), while about ten molar percent of the glycerol molecules may be non-functionalized (with three unreacted hydroxyl groups available for subsequent reaction). It will be appreciated that alternative number of molar equivalents (e.g., a value in a range of between about 0.5 and about 1) may be used, resulting in alternative molar percentages of functionalized/non-functionalized polyol molecules.

A particular "loading" (e.g., a weight percentage) of phosphorus (P) in the flame-retardant polymer may vary depending on the particular polyols, phosphorus-containing containing materials, and polyacids that are used in the two reactions illustrated in FIG. 2. As an illustrative, non-limiting example, a weight percentage of phosphorus (P) in the polymer of between about 15 weight percent and about 20 weight percent may be sufficient to satisfy a particular plastics flammability standard (e.g., the UL 94 V-0 plastics flammability standard). It will be appreciated that a particular number of molar equivalents of a particular phosphorus-containing material that are reacted with a particular polyol may be calculated accordingly (e.g., to achieve a desired weight percentage of phosphorus (P) in the flame-retardant polymer).

In the example of FIG. 2, the phosphorus-functionalized polyol derivative includes a first unreacted hydroxyl group of the polyol and a second unreacted hydroxyl group of the polyol. As an illustrative non-limiting example, hydroxyl group number 1 of propane-1,2,3-triol (glycerol) may react with the phosphorus-containing material to form a phosphorus-functionalized polyol derivative having a single phosphorus moiety. In this example, the first unreacted hydroxyl group of the phosphorus-functionalized glycerol derivative may correspond to hydroxyl group number 2 of propane-1,2,3-triol, and the second unreacted hydroxyl group of the phosphorus-functionalized glycerol derivative may correspond to hydroxyl group number 3 of propane-1,2,3-triol. In this example, hydroxyl group number 2 remains available for reaction with a polyacid, and hydroxyl group number 3 remains available for reaction with a polyacid. In the example of FIG. 2, each of the three hydroxyl groups (hydroxyl group numbers 1, 2, and 3 of propane-1,2,3-triol) of non-functionalized glycerol molecules remain available for reaction with a polyacid.

The second reaction of FIG. 2 illustrates that the phosphorus-functionalized glycerol derivative and the non-functionalized glycerol may be reacted with a polyacid to form a flame-retardant polymer (e.g., a cross-linked polyester) with phosphorus chemically bound to a polymer chain. In some cases, the polyacid may be produced from renewable materials. As an illustrative example, a (poly)carboxylic acid, such as a tricarboxylic acid (e.g., citric acid), may be used. In a particular embodiment, a tri-acid may be selected for use in combination with a triol. The combination of a triol (e.g., glycerol) with a tri-acid (e.g., a tricarboxylic acid, such as citric acid) may result in a flame-retardant polymer with a high degree of cross-linking (and associated improvement in chemical and/or mechanical material properties).

The second reaction of FIG. 2 shows an illustrative, non-limiting example of cross-linking that may occur as a result of a primary hydroxyl group of the non-functionalized glycerol (e.g., hydroxyl group number 1 of propane-1,2,3-triol) reacting with one of the replaceable hydrogen atoms of a particular polyacid molecule, while another replaceable hydrogen atom of the particular polyacid molecule reacts with an unreacted hydroxyl group of the phosphorus-functionalized polyol derivative. In the example of FIG. 2, the unreacted hydroxyl group of the phosphorus-functionalized polyol derivative corresponds to the second unreacted hydroxyl group of the phosphorus-functionalized glycerol derivative (corresponding to hydroxyl group number 3 of propane-1,2,3-triol). Thus, FIG. 2 illustrates a particular example of cross-linking in a flame-retardant polymer with phosphorus chemically bound to a polymer chain. It will be appreciated that cross-linking may occur as a result of reaction of polyacid molecules with various alternative and/or additional unreacted hydroxyl groups (of the non-functionalized polyol, the phosphorus-functionalized glycerol derivative, or any combination thereof). Further, other monomers and/or reactants may be used to form alternative polymers that have inherent flame-retardant characteristics as a result of phosphorus being chemically bound to a polymer chain.

Figure 3:
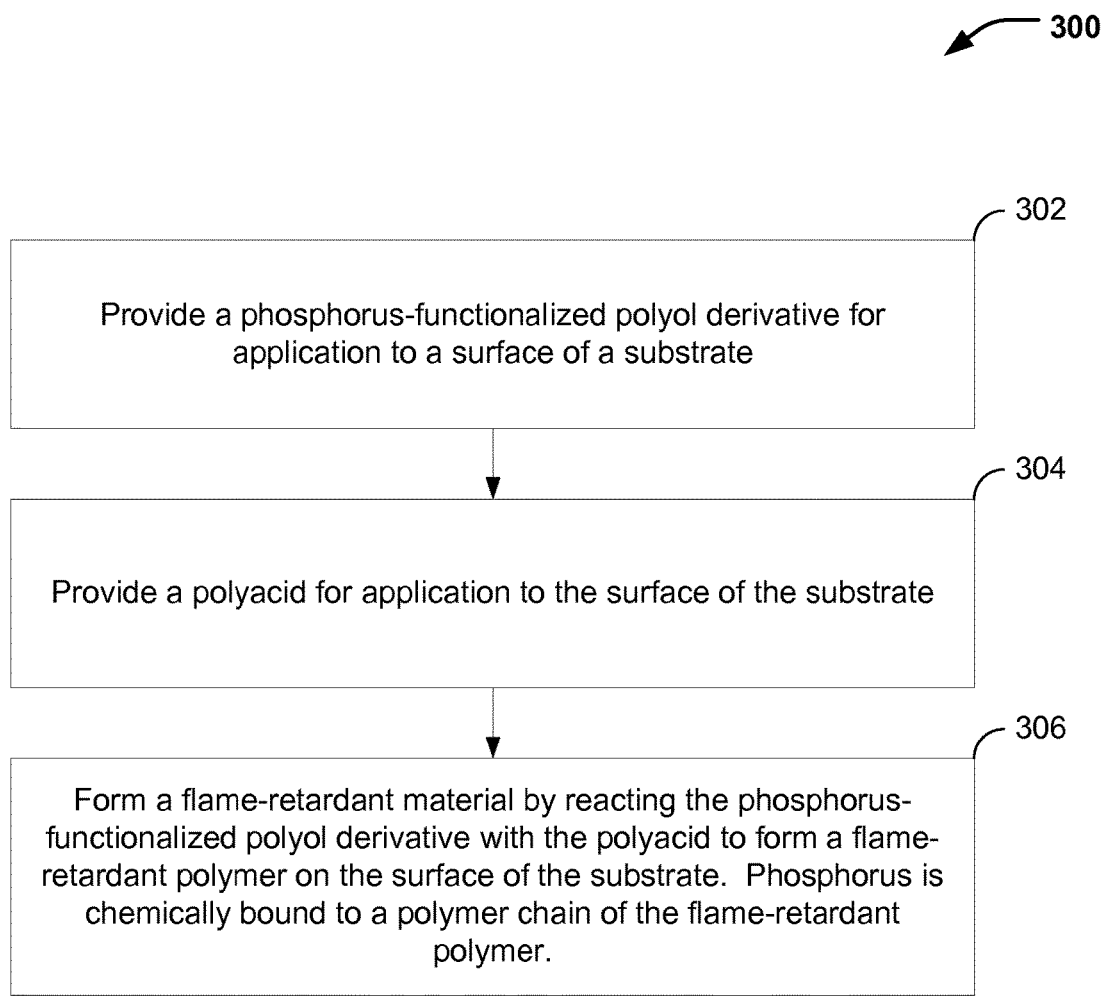
FIG. 3 is a flow diagram illustrating a particular embodiment of a method of forming a flame-retardant material by reacting a phosphorus-functionalized polyol derivative with a polyacid.

As described further herein with respect to FIG. 3, the flame-retardant polymer may be formed on a surface of a substrate. To illustrate, the flame-retardant polymer may be formed on a surface of a component of an electronic device (e.g., prior to assembly of the electronic device). In some cases, the component may fail to satisfy a plastics flammability standard prior to formation of the flame-retardant polymer on the surface of the component. After the formation of the flame-retardant polymer, the component may satisfy the plastics flammability standard. As an illustrative, non-limiting example, the plastics flammability standard may specify a burning stop rate of not less than 10 seconds on a vertical specimen of the component. Alternatively or additionally, the plastics flammability standard may allow drips of non-inflamed particles but may not allow drips of flaming particles.

Thus, FIG. 2 illustrates an example of a process of producing a phosphorus-functionalized polyol derivative that may be reacted with a polyol, resulting in a polymer with phosphorus chemically bound to a polymer chain. FIG. 2 further illustrates that reaction stoichiometry may be controlled such that a first subset of polyol molecules is partially phosphorus-functionalized (e.g., at least one phosphorus moiety is added), while a second subset of polyol molecules is non-functionalized. A degree of functionalization may be adjusted such that a particular amount of phosphorus is chemically bound to a polymer chain in order to impart particular flame retardancy characteristics. In some cases, the flame-retardant polymer may be formed on a surface of a component of an electronic device (e.g., prior to assembly of the electronic device) in order to satisfy a plastics flammability standard (e.g., the UL 94 standard).

FIG. 3 is a flow diagram that illustrates a particular embodiment of a method 300 of forming a flame-retardant material using a flame-retardant polymer formed from a polyol and a polyacid. In a particular embodiment, the flame-retardant polymer may be formed on a surface of a component of an electronic device prior to assembly of the electronic device (e.g., in order to satisfy a particular plastics flammability standard, such as the UL 94 standard).

The method 300 includes providing a phosphorus-functionalized polyol derivative for application to a surface of a substrate, at 302. For example, the phosphorus-functionalized polyol derivative may correspond to the (partially) phosphorus-functionalized polyol derivative illustrated in FIG. 1 or FIG. 2. As described herein with respect to FIGS. 1 and 2, the phosphorus-functionalized polyol derivative may be formed by reacting a polyol (having two or more hydroxyl groups) with a phosphorus-containing material. While FIGS. 1 and 2 illustrate an example of a reaction of glycerol with diphenylphosphinic chloride to produce a phosphorus-functionalized glycerol derivative, alternative polyol(s) and/or phosphorus-containing material(s) may be used to form alternative phosphorus-functionalized polyol derivative(s). To illustrate, while glycerol is a byproduct of biodiesel production and may represent a relatively inexpensive polyol feedstock material, other examples of biologically derived polyols may include polyols derived from sugars, soybean oil, or castor oil, among other alternatives.

In some cases, the method 300 may also include providing a non-functionalized polyol in addition to the phosphorus-functionalized polyol derivative. For example, the non-functionalized polyol may correspond to the non-functionalized polyol illustrated in FIG. 2, resulting from control of reaction stoichiometry. As another example, an additional amount of polyol may be provided prior to reaction of the phosphorus-functionalized polyol derivative with a polyacid (e.g., for increased cross-linking). In some cases, the additional polyol may correspond to the polyol that is used to produce the phosphorus-functionalized polyol derivative (e.g., glycerol in the examples of FIGS. 1 and 2). In other cases, the additional polyol may correspond to one or more other polyols (e.g., a diol, a triol, etc.).

The method 300 further includes providing a polyacid for application to the surface of the substrate, at 304. For example, the polyacid may correspond to the polyacid illustrated in FIG. 1 or FIG. 2. As described herein, in some cases, the polyacid may be produced from renewable materials. For example, a (poly)carboxylic acid such as a tricarboxylic acid (e.g., citric acid) may be used. In a particular embodiment, a tri-acid may be selected for use in combination with a triol (e.g., glycerol).

The method 300 also includes forming a flame-retardant material by reacting the phosphorus-functionalized polyol derivative with the polyacid to form a flame-retardant polymer on the surface of the substrate, at 306. Phosphorus is chemically bound to a polymer chain of the flame-retardant polymer. Chemically binding phosphorus to a polymer chain may result in a polymer with "inherent" flame-retardancy characteristics. Rather than "loading" a polymer with a phosphorus additive after polymerization, an amount of phosphorus that is chemically bound to a polymer chain may be controlled in order to impart particular flame-retardancy characteristic(s). In some cases, the phosphorus-functionalized polyol derivative and the polyacid may be mixed prior to application to the surface of the substrate. In other cases, the phosphorus-functionalized polyol derivative and the polyacid may be "mixed in place" on the surface of the substrate.

In a particular embodiment, the flame-retardant polymer of FIG. 1 or the flame-retardant polymer of FIG. 2 may be formed on a surface of a component of an electronic device prior to assembly of the electronic device. The component may fail to satisfy a plastics flammability standard prior to forming the flame-retardant polymer. To illustrate, the plastics flammability standard may be associated with use of plastic(s) as component(s) of an electronic device. The formation of the flame-retardant polymer on the surface of the component may allow the component to satisfy the plastics flammability standard. As an illustrative, non-limiting example, the plastics flammability standard may specify a burning stop rate of not less than 10 seconds on a vertical specimen of the component. Alternatively or additionally, the plastics flammability standard may allow drips of non-inflamed particles but may not allow drips of flaming particles.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process for the production of a flame-retardant polymer, the process comprising:
    reacting a triol compound with an organophosphate mono-chloride compound to produce a phosphorus-functionalized hydroxyl material;
    reacting the phosphorus-functionalized hydroxyl material with a polycarboxylic acid to form a flame-retardant polymer; and
    providing a functional excess of the triol compound to the organophosphate mono-chloride compound to control an amount of phosphorus in the flame-retardant polymer, wherein phosphorus is chemically bound to a polymer chain of the flame-retardant polymer.

2. The process of claim 1, wherein the flame-retardant polymer includes a cross-linked polyester.

3. The process of claim 1, wherein the phosphorus-functionalized hydroxyl material includes an unreacted hydroxyl group of the triol compound.

4. The process of claim 3, wherein the unreacted hydroxyl group of the phosphorus-functionalized hydroxyl material reacts with the polycarboxylic acid.

5. The process of claim 1, wherein the phosphorus-functionalized hydroxyl material includes two unreacted hydroxyl groups of the triol compound.

6. The process of claim 5, wherein the unreacted hydroxyl groups react with the polycarboxylic acid.

7. The process of claim 1, wherein a molar ratio of the organophosphate mono-chloride compound to the triol compound is not greater than about 1.

8. The process of claim 1, wherein a molar ratio of the organophosphate mono-chloride compound to the triol compound is not less than about 0.5.

9. The process of claim 1, wherein the triol compound includes glycerol.

10. The process of claim 1, wherein the organophosphate mono-chloride compound includes diphenylphosphinic chloride.

11. The process of claim 1, wherein the polycarboxylic acid is a triacid.

12. The process of claim 1, wherein the phosphorus-functionalized hydroxyl material includes an unreacted portion of the triol compound.

13. The process of claim 1, wherein reacting the triol compound with the organophosphate mono-chloride compound comprises adding the triol compound to a tertiary amine and a solvent to form a mixture, and adding the organophosphate mono-chloride compound to the mixture.

14. The process of claim 13, wherein the organophosphate mono-chloride compound is added to the mixture dropwise.

15. The process of claim 1, further comprising isolating the phosphorus-functionalized hydroxyl material.

\* \* \* \* \*